(12) United States Patent
Tesar (10) Patent No.: US 11,014,658 B1
(45) Date of Patent: May 25, 2021

(54) DRIVELINE ARCHITECTURE FOR ROTORCRAFT FEATURING ACTIVE RESPONSE ACTUATORS

(71) Applicant: Delbert Tesar, Austin, TX (US)

(72) Inventor: Delbert Tesar, Austin, TX (US)

(*) Notice: Subject to any disclaimer, the term of this patent is extended or adjusted under 35 U.S.C. 154(b) by 902 days.

(21) Appl. No.: 14/987,455

(22) Filed: Jan. 4, 2016

Related U.S. Application Data (60) Provisional application No. 62/099,373, filed on Jan. 2, 2015.

(51) Int. Cl.
| | | |
|---|---|---|
| *B64C 27/14* | (2006.01) | |
| *B64C 27/59* | (2006.01) | |
| *B64C 27/68* | (2006.01) | |
| *B64D 35/00* | (2006.01) | |
| *B64C 27/52* | (2006.01) | |
| *B64C 27/625* | (2006.01) | |

(52) U.S. Cl.
CPC .............. *B64C 27/14* (2013.01); *B64C 27/52* (2013.01); *B64C 27/59* (2013.01); *B64C 27/625* (2013.01); *B64C 27/68* (2013.01); *B64D 35/00* (2013.01)

(58) Field of Classification Search
CPC ......... B64C 27/12; B64C 27/14; B64C 27/52; B64C 27/59; B64C 27/605; B64C 27/625; B64C 27/68; B64D 35/00; B64D 35/08; B64D 27/04
See application file for complete search history.

(56) References Cited

U.S. PATENT DOCUMENTS

| | | | |
|---|---|---|---|
| 276,776 | A | 5/1883 | Clemons |
| 341,389 | A | 5/1886 | Prescott |
| 386,168 | A | 7/1888 | Spencer et al. |
| 1,601,750 | A | 10/1926 | Wildhaber |
| 2,084,844 | A | 6/1937 | Harris |
| 2,750,850 | A | 6/1956 | Wildhaber |
| 3,176,774 | A * | 4/1965 | Krinsky ............. B64C 27/52 |
| | | | 416/130 |
| 3,310,990 | A | 3/1967 | Zettel |
| 3,371,552 | A | 3/1968 | Soper |
| 3,454,394 | A | 7/1969 | Honobe |

(Continued)

FOREIGN PATENT DOCUMENTS

| | | |
|---|---|---|
| EP | 0058025 A1 | 8/1982 |
| EP | 0527483 A2 | 2/1993 |

(Continued)

OTHER PUBLICATIONS

Ghionea, Adrian et al.; "Utilization of Some Computer Assisted Techniques in Generating and Study of the Hypocycloidal Flanks of the Spur Gear Teeth Stress"; 5th International Meeting of the Carpathian Region Specialists In The Field of Gears; May 2004; 8 pages.

(Continued)

*Primary Examiner* — Christopher Verdier
(74) *Attorney, Agent, or Firm* — John A. Fortkort; Fortkort & Houston PC (57) ABSTRACT

A rotorcraft is provided which includes a rotor hub, a rotatable universal joint which tilts said rotor hub, and a plurality of servo drives which rotate the universal joint. The plurality of servo drives preferably includes four servomotors coupled together in a velocity summing arrangement to produce a single motion output.

14 Claims, 7 Drawing Sheets

(56) References Cited

U.S. PATENT DOCUMENTS

| | | |
|---|---|---|
| 3,640,183 A | 2/1972 | Koch et al. |
| 3,679,956 A | 7/1972 | Redmond |
| 3,705,522 A | 12/1972 | Ogawa |
| 3,709,055 A | 1/1973 | Grove |
| 3,729,276 A | 4/1973 | Boyadjieff et al. |
| 3,841,586 A | 10/1974 | Broadley et al. |
| 3,907,470 A | 9/1975 | Harle et al. |
| 4,095,150 A | 6/1978 | Senckel |
| 4,270,401 A | 6/1981 | Davidson |
| 4,367,424 A | 1/1983 | Presley |
| 4,407,170 A | 10/1983 | Fukui |
| 4,505,166 A | 3/1985 | Tesar |
| 4,538,961 A | 9/1985 | Pariani |
| 4,573,873 A | 3/1986 | Yao et al. |
| 4,585,392 A | 4/1986 | Curci |
| 4,669,958 A | 6/1987 | Peyran et al. |
| 4,688,993 A | 8/1987 | Ferris et al. |
| 4,696,445 A | 9/1987 | Wright et al. |
| 4,768,400 A | 9/1988 | McKay |
| 4,846,018 A | 7/1989 | Matsumoto et al. |
| 4,922,781 A | 5/1990 | Peiji |
| 4,988,581 A | 1/1991 | Wycliffe |
| 5,083,725 A | 1/1992 | Byrnes et al. |
| 5,092,738 A | 3/1992 | Byrnes et al. |
| 5,102,377 A | 4/1992 | Spanski |
| 5,116,291 A | 5/1992 | Toyosumi et al. |
| 5,135,356 A | 8/1992 | Shepherd |
| 5,240,661 A | 8/1993 | Parker et al. |
| 5,242,267 A | 9/1993 | Byrnes et al. |
| 5,271,295 A * | 12/1993 | Marnot ................. B64C 27/14 244/58 |
| 5,293,107 A | 3/1994 | Akeel |
| 5,340,279 A | 8/1994 | Cycon et al. |
| 5,355,743 A | 10/1994 | Tesar |
| 5,372,479 A | 12/1994 | Byrnes et al. |
| 5,431,538 A | 7/1995 | Schmaling et al. |
| 5,431,540 A | 7/1995 | Doolin et al. |
| 5,460,487 A | 10/1995 | Schmaling et al. |
| 5,499,903 A | 3/1996 | Schmaling et al. |
| 5,511,947 A | 4/1996 | Schmuck |
| 5,562,415 A | 10/1996 | Legendre et al. |
| 5,599,167 A | 2/1997 | Daldosso |
| 5,628,620 A | 5/1997 | Arlton |
| 5,692,989 A | 12/1997 | Kamlukin |
| 5,704,864 A | 1/1998 | Yanagisawa |
| 5,740,987 A | 4/1998 | Morris et al. |
| 5,810,562 A | 9/1998 | Byrnes et al. |
| 5,906,476 A | 5/1999 | Arlton |
| 6,033,182 A | 3/2000 | Rampal |
| 6,074,168 A | 6/2000 | Rampal et al. |
| 6,102,659 A | 8/2000 | Rampal |
| 6,119,542 A | 9/2000 | Arbrink |
| 6,149,386 A | 11/2000 | Rampal |
| 6,152,696 A | 11/2000 | Rampal |
| 6,200,097 B1 | 3/2001 | Mouille |
| 6,231,005 B1 | 5/2001 | Costes |
| 6,286,783 B1 * | 9/2001 | Kuenkler ............... B63H 5/125 244/26 |
| 6,325,326 B1 | 12/2001 | Pancotti |
| 6,360,987 B1 | 3/2002 | Sallaee et al. |
| 6,367,571 B1 | 4/2002 | Schwarz |
| 6,672,966 B2 | 1/2004 | Muju et al. |
| 6,791,215 B2 | 9/2004 | Tesar |
| 6,886,777 B2 | 5/2005 | Rock |
| 6,948,402 B1 | 9/2005 | Amendolea |
| 6,991,580 B2 | 1/2006 | Elser et al. |
| 7,081,062 B2 | 7/2006 | Tesar |
| 7,122,926 B2 | 10/2006 | Tesar |
| 7,201,700 B2 | 4/2007 | Buxton |
| 7,431,676 B2 | 10/2008 | Tesar |
| 7,534,184 B2 | 5/2009 | Tsurumi |
| 7,552,664 B2 | 6/2009 | Bulatowicz |
| 7,553,249 B2 | 6/2009 | Nohara |
| 7,604,599 B2 | 10/2009 | Fujimoto et al. |
| 7,641,579 B2 | 1/2010 | Junkers |
| 7,722,494 B2 | 5/2010 | Tesar |
| 7,766,634 B2 | 8/2010 | Liavas et al. |
| 7,811,193 B2 | 10/2010 | Nakamura |
| 7,935,017 B2 | 5/2011 | Kurita et al. |
| 7,942,779 B2 | 5/2011 | Kobayashi |
| 7,976,420 B2 | 7/2011 | Nakamura |
| 7,988,581 B2 | 8/2011 | Kobayashi |
| 8,022,564 B2 | 9/2011 | Nohara et al. |
| 8,027,772 B2 * | 9/2011 | Vialle ................... B60W 10/06 244/17.11 |
| 8,029,400 B2 | 10/2011 | Nakamura |
| 8,033,942 B2 | 10/2011 | Tesar |
| 8,047,943 B2 | 11/2011 | Nakamura |
| 8,091,445 B1 | 1/2012 | Stevens et al. |
| 8,117,945 B2 | 2/2012 | Nakamura |
| 8,142,158 B2 | 3/2012 | Schmaling et al. |
| 8,162,789 B2 | 4/2012 | Takeuchi |
| 8,197,205 B2 * | 6/2012 | Rudley ................... B64C 27/72 416/1 |
| 8,235,856 B2 | 8/2012 | Nakamura |
| 8,308,599 B2 | 11/2012 | Akami |
| 8,322,242 B2 | 12/2012 | Gronli |
| 8,323,140 B2 | 12/2012 | Nakamura |
| 8,353,798 B2 | 1/2013 | Miyoshi et al. |
| 8,382,629 B2 | 2/2013 | Hirata |
| 8,435,149 B2 | 5/2013 | Koyama et al. |
| 8,523,732 B2 | 9/2013 | Le Moal |
| 8,545,357 B2 | 10/2013 | Hibino |
| 8,668,613 B1 | 3/2014 | Stevens et al. |
| 9,193,454 B2 | 11/2015 | Modrzejewski et al. |
| 2003/0027681 A1 | 2/2003 | Kakemo |
| 2004/0007923 A1 | 1/2004 | Tesar |
| 2004/0102274 A1 | 5/2004 | Tesar |
| 2004/0103742 A1 | 6/2004 | Tesar |
| 2004/0126238 A1 | 7/2004 | Scala |
| 2005/0168084 A1 | 8/2005 | Tesar |
| 2005/0221945 A1 | 10/2005 | Plath |
| 2006/0264292 A1 | 11/2006 | Plath |
| 2007/0168081 A1 | 7/2007 | Shin et al. |
| 2007/0249457 A1 | 10/2007 | Tesar |
| 2008/0006739 A1 * | 1/2008 | Mochida ................ B64C 27/04 244/60 |
| 2008/0060473 A1 | 3/2008 | Li |
| 2008/0111399 A1 | 5/2008 | Zierten |
| 2008/0139357 A1 | 6/2008 | Fujimoto |
| 2008/0257088 A1 | 10/2008 | Tesar |
| 2008/0269922 A1 | 10/2008 | Tesar |
| 2008/0295623 A1 | 12/2008 | Kurita et al. |
| 2009/0075771 A1 | 3/2009 | Tesar |
| 2009/0118050 A1 | 5/2009 | Takeuchi |
| 2009/0220341 A1 | 9/2009 | Schmaling et al. |
| 2010/0113206 A1 | 5/2010 | Wang et al. |
| 2010/0230547 A1 | 9/2010 | Tayman |
| 2011/0072920 A1 | 3/2011 | Gronli |
| 2011/0315806 A1 | 12/2011 | Piasecki et al. |
| 2012/0088622 A1 | 4/2012 | Tesar |
| 2012/0204671 A1 | 8/2012 | Tesar |
| 2012/0215450 A1 | 8/2012 | Ashok et al. |
| 2013/0062455 A1 | 3/2013 | Lugg et al. |
| 2013/0119185 A1 | 5/2013 | Botti et al. |
| 2013/0217530 A1 | 8/2013 | Tesar |
| 2014/0154074 A1 * | 6/2014 | Zientek ................ B64C 27/605 416/1 |
| 2014/0224064 A1 | 8/2014 | Tesar |
| 2014/0228162 A1 | 8/2014 | Tesar |
| 2014/0246893 A1 | 9/2014 | Tesar |
| 2014/0263854 A1 | 9/2014 | Ross et al. |
| 2015/0028597 A1 | 1/2015 | Eller et al. |
| 2015/0102655 A1 | 4/2015 | Tesar |
| 2015/0217613 A1 | 8/2015 | Piasecki et al. |
| 2015/0292601 A1 | 10/2015 | Tesar |
| 2015/0330455 A1 | 11/2015 | Tesar |

(56) References Cited

U.S. PATENT DOCUMENTS

| | | | |
|---|---|---|---|
| 2015/0354667 A1 | 12/2015 | Tesar | |
| 2017/0349275 A1* | 12/2017 | Eller | B64C 27/10 |

FOREIGN PATENT DOCUMENTS

| | | | |
|---|---|---|---|
| EP | 2149724 | A1 | 2/2010 |
| EP | 2169263 | B1 | 3/2010 |
| GB | 008203 | | 4/1903 |
| GB | 224449 | | 11/1924 |
| GB | 419171 | | 11/1934 |
| GB | 426136 | | 3/1935 |
| GB | 450246 | | 7/1936 |
| GB | 676894 | | 8/1952 |
| GB | 759185 | | 10/1956 |
| GB | 775629 | | 5/1957 |
| GB | 856486 | | 12/1960 |
| GB | 926760 | | 5/1963 |
| GB | 1083689 | | 9/1967 |
| GB | 1104250 | | 2/1968 |
| GB | 1176936 | | 1/1970 |
| GB | 1179105 | | 1/1970 |
| GB | 1378909 | | 3/1972 |
| GB | 1409651 | | 10/1975 |
| GB | 1453135 | | 10/1976 |
| GB | 1453135 | A | 10/1976 |
| GB | 1494895 | | 12/1977 |
| GB | 2014260 | A | 8/1979 |
| GB | 2377740 | A | 1/2003 |
| GB | 2387882 | A | 10/2003 |
| GB | 2489503 | A | 10/2012 |
| WO | 96/04493 | A1 | 2/1996 |

OTHER PUBLICATIONS

Jones, Chris M. Sr.; "'Real-Time' Travel: A Strategy for Distributed Synchronized Actuator Control Using Open Standards"; Naval Engineers White Paper; 9 pages.

Rabindran, Dinesh et al.; "A Differential-Based Dual Actuator for a Safe Robot Joint: Theory and Experiments"; World Automated Congress (WAC); Aug. 2014; 6 pages.

Tesar, Delbert et al.; "Test-Bed to Measure the Performance Criteria of Actuators"; Robotics Research Group, University of Texas at Austin, 2002 Deliverable for Thread 3: High Performance Envelope Based on Intelligent; Dec. 1, 2001; 14 pages.

Townsend, Dennis P.; "A Comparison of the Double-Circular-Arc-Gear Drives With Standard Involute Gear Drives"; Abstract; www.pumpjack.com/downloads; 8 pages.

Litvin, Faydor L. et al.; "Helical Gears With Circular Arc Teeth: Generation, Geometry, Precision and Adjustment to Erros, Computer Aided Simulation of Conditions of Meshing, and Bearing Contact"; NASA Contractor Report 4089; AVSCOM Technical Report 87-C-18; Oct. 1987; 95 pages.

Krishnamoorthy, Ganesh et al.; "Multi-Sensor Architecture for Intelligent Electromechanical Actuators"; 12th IFToMM World Congress, Besancon, France; Jun. 18-21, 2007; 6 pages.

Lim, Gee Kwang et al.; "Modeling and Simulation of a Stewart Platform Type Parallel Structure Robot"; Final Report, Grant No. NAG 9-188; The University of Texas at Austin, Mechanical Engineering Department; Apr. 1989; 216 pages.

Lee, Hoon et al.; "An Analytical Stiffness Analysis Between Actuator Structure and Principal Bearings Used for Robot Actuators"; Proceedings of ASME 2011 International Design Engineering Technical Conference and Computers and Information in Engineering Conference; IDEC/CIE 2011; Aug. 29-31, 2011; Washington, D.C.; 10 pages.

Koran, Lucas et al.; "Duty Cycle Analysis to Drive Intelligent Actuator Development"; IEEE Systems Journal; May 2008; 14 pages.

Ashok, Pradeepkumar et al.; "Guidelines for Managing Sensors in Cyber Physical Systems with Multiple Sensors"; Research Article; Hindawi Publishing Corporation, Journal of Sensors; vol. 2011, Article ID 321709; Nov. 22, 2011; 16 pages.

Hvass, Paul Brian et al.; "Condition Based Maintenance for Intelligent Electromechanical Actuators"; Research Paper; Jun. 2004; 262 pages.

Kang, Seong-Flo et al.; "Indoor GPS Metrology System with 3D Probe for Precision Applications"; ASPE.pointinspace.com/publications/annual_2004 Papers; 2004; 4 pages.

Knight, W.; "The Robots Running This Way"; MIT Technology Review; 2014; 8 pages.

Ting, Yung et al.; "A Control Structure for Fault-Tolerant Operation of Robotic Manipulators"; Research Paper; University of Texas at Austin, Department of Mechanical Engineering; Apr. 1993; 10 pages.

Ryder, Redudant Actuator Development Study, Final Report, Dec. 1973, p. 1-73, Boeing Commercial Airplane CO., Seattle, Washington, USA.

Stevens et al, VariablelMultispeed Rotorcraft Drive System Concepts, NASA/TM, Mar. 2009, p. 1-37, National Aeronautics and Space Administration, Cleveland, OH, USA.

Stevens et al, Concepts for Multi-Speed Rotorcraft Drive System—Status of Design and Testing at NASA GRC, AHS 71st Annual Forum, May 2015, p. 1-17, NASA—John H. Glenn Research Center, Brook Park, OH, USA.

Dubois et al, Main Gearbox Remains Helicopters' Achilles Heel, Business Aviation, Jan. 2013, p. 1-6.

Black, New aerocomposites niche: Helicopter transmission gears?, Composites World, Feb. 2015, p. 1-4, Gardner Business Media, Inc, Cincinnati, OH, USA.

* cited by examiner

TWO SPEED OSPREY DEVELOPMENT REQUIREMENTS (Maintain Continuous Torque on Both Propellers)

1. CRUISE/LIFT REQUIREMENTS
   - Cruise
     - 167 RPM, 3000 HP.
     - Maximize Efficiency
     - Extend Range
   - Lift
     - 333 RPM, 6000 HP.
     - Maximize Life
   - No Single Point Failure
     - Cross Coupling For Propellers
     - Freewheel Unpowered Turbine 2. CROSS COUPLING DESIGN OPTIONS
   - 5 to 1 Chain Drive
     - To Drive Parallel Shaft
   - Four-bevel Gear Box
     - Unloads Bearings
   - Replace Torque Tube
     - Consider Steel Belt 3. RECOMMENDED SPEED CHANGE SCENARIO
   - Down Shift Propeller Speed
     - Provides Cruise Operation
     - Propeller Drag Assists Shift
     - Less Critical Operation
   - Up Shift Propeller Speed
     - Provides Lift Operation
     - Demands Complete Prop Control
     - Safety Is Critical
   - Freewheel One Power Turbine
     - Second Turbine at Full Power
     - 50% Power To Each Prop
     - Shift Unloaded Drive Train
   - Freewheel Second Power Turbine
     - First Turbine at Full Power
     - 50% Power to Each Prop
     - Shift Second Drive Train
   - Full Power for Both Turbines
     - Provides Full Lift

Attributes of Preferred Embodiment of OSPREY Gear Trains (Combination of Inverted/2-Speed Star Compound GT)

1. TECHNOLOGY DESCRIPTION
- Cross Roller Bearing
  - Extremely Rugged/Stiff
  - Resists Forces In All Directions
  - Reduces Attachment Steel
- Output Internal Gear
  - Driven by 3 Star Gears
  - Uses Helical Teeth
  - May Use Circular Arc Teeth
- Synchro-Mesh Clutch
  - Servo Operation
  - 3 Positions (Low, High, Neutral)
- Gear Mesh Diameters
  - Ratios of 1.7, 2, 3.3
  - Not Demanding
- Low Friction Losses
  - Low Velocity Bearings
  - Low Windage, Oil Churning
- Bearings In Rigid Frames
  - Solid Strong Back Walls

2. TWO SPEED TRANSMISSION
- Power Turbine
  - Drives Slip Clutch
  - Freewheel Safety
- 9 to 1 Front End
  - Inverted Star Compound
  - High Velocity Input
  - Low Inertia
- Two-Speed MDP
  - Drives Propeller
  - 5, 10 to 1 Ratios
  - Synchro Mesh Clutch
- Shortest Force Path
  - Rugged Cross Roller Bearing
  - Supports Propeller
  - Last Stage Bearing
- Expected Benefits
  - 2.5x Reduction In Length
  - 2.0x Reduction in Weight

*FIG. 7*

DRIVELINE ARCHITECTURE FOR ROTORCRAFT FEATURING ACTIVE RESPONSE ACTUATORS

CROSS-REFERENCE TO RELATED APPLICATION

This application claims the benefit of priority from U.S. provisional application No. 62/099,373, filed Jan. 2, 2015, having the same title and the same inventor, and which is incorporated herein by reference in its entirety.

FIELD OF THE DISCLOSURE

The present disclosure relates generally to rotorcraft driveline architectures, and more particularly to driveline architectures for a rotorcraft which feature active response actuators.

BACKGROUND OF THE DISCLOSURE

Since the development of the first operational helicopter (the Focke-Wulf Fw 61) in 1936, rotorcraft have become a staple of modern aviation. Because of their reliance on rotors to provide lift and thrust, these aircraft are able to perform vertical take-offs and landings, and to move forward, backward or laterally through the air. Consequently, rotorcraft are inherently more suited to a number of applications than their fixed-wing counterparts.

Modern rotorcraft have a number of critical components, including drive shafts, gears, rotors, engines, landing gear, flight controls, and electronic systems. Each of these components must operate independently and in concert to keep the rotorcraft airborne. Consequently, rotorcraft are characterized by multiple single-point failures.

Not surprisingly, rotorcraft experience a much higher accident rate than their fixed-wing counterparts. Thus, recent statistics have shown that the accident rate for helicopters is about 7.5 per 100,000 flight hours, compared to an accident rate of only 0.175 accidents per 100,000 flight hours for their fixed-wing counterparts. These accident rates may be significantly higher in more demanding applications, such as military operations, fire-fighting campaigns and rescue operations. In these applications, the rotorcraft may be required to operate in sub-optimal conditions and close to (or at) the limits of their design tolerances.

SUMMARY OF THE DISCLOSURE

In one aspect, a rotorcraft is provided comprising a rotable hub having a plurality of blades attached thereto, wherein a pair of velocity summing actuators is disposed face-to-face between each of said blades and said rotor hub.

In another aspect, a rotorcraft is provided which comprises a rotor hub, a rotatable universal joint which tilts said rotor hub, and a plurality of servo drives which rotate said universal joint. The plurality of servo drives tilt the rotor hub by rotating the universal joint.

In a further aspect, a rotorcraft is provided which comprises a cabin having a first longitudinal axis, and a turbine which includes a turbine drive shaft having a second longitudinal axis that is perpendicular to said first longitudinal axis.

In still another aspect, a rotorcraft is provided which comprises at least one rotor blade that rotates in a plane, and a turbine which includes a turbine drive shaft having a longitudinal axis which is perpendicular to said first plane.

In yet another aspect, a rotorcraft is provided whose driveline comprises a turbine equipped with a base on a first end thereof and a rotor hub on a second end thereof, and whose driveline is further equipped with a slip clutch, a 2-to-1 inverted star compound reducer, a first switchable (on/off) star compound hub drive having a first output plate attached to the frame of a second switchable star compound hub drive having a second output plate which is attached to the hub drive of the rotor. The second output plate is attached to the first output plate in a face-to-face arrangement. The rotorcraft further comprises at least one rotor blade, attached to said rotor hub, which rotates in a first plane. The turbine preferably has a longitudinal axis that is essentially perpendicular to the first plane along the driveline axis.

In another aspect, a rotorcraft is provided which comprises first and second turbines which operate in parallel to eliminate single point failures.

In still another aspect, a vertical take-off and landing (VTOL) aircraft is provided which comprises a power turbine; a power clutch driven by said power turbine; an inverted star compound gear train which is driven by said power clutch; a multi-speed drive propeller (MDP) which is driven by said inverted star compound gear train; and a propeller which is driven by said MDP.

DETAILED DESCRIPTION

Despite the many advances in rotorcraft design which have occurred since the introduction of the first operational helicopter, further improvements in these aircraft are still needed. Rotorcraft are unusually complex systems in which each blade must cyclically rotate (twist) to match desired lift characteristics. However, flexure of the blades may cause them to lead or lag during the rotational cycle, and gyroscopic forces tend to lead these motions by 90° in the cycle.

Moreover, operational conditions frequently place changing demands on these systems. For example, low level flight conditions place different demands on rotorcraft compared to higher elevation flight conditions, with the thinner air encountered at higher altitudes leading to reductions in payload capacity. Similarly, poor weather conditions and wind can substantially affect the flight stability of rotorcraft. Consequently, the margins of safety associated with rotorcraft are frequently low or uncertain.

Furthermore, the rotor blade drives in modern rotorcraft are mechanically complex, require constant maintenance, and cause considerable drag during flight (which typically occurs at more than 200 mph). Unfortunately, in the standard rotorcraft architecture, the power turbine typically lies perpendicular to the rotor mast, requiring a 90° turn to transfer power. The resulting transmission is one of the most complex and delicate in existence. Moreover, the quality required of the mechanical design, gear manufacture, bearings, tuned vibration modes, and other components is exceptional.

The foregoing issues place a premium on astute pilot management. In particular, during flight, the pilot must maintain constant awareness of ambient conditions and of the status of various critical components of the rotorcraft. However, despite rigorous pilot training requirements, commercial flights of rotorcraft remain limited due to frequent transmission "incidents".

It has now been found that some or all of the foregoing issues may be addressed by equipping rotorcraft, and especially the transmission systems thereof, with active response capabilities. In particular, the foregoing issues demonstrate that existing rotorcraft transmissions have reached their design/science limits. Conventional rotorcraft transmissions are replete with single point failures capable of causing flight failure, which may be somewhat mitigated in some cases by rotor auto-rotation to achieve a "hard landing". Replacement of these passive mechanical drives with active drives, such as those provided by electro-mechanical actuators (EMAs), have the potential to provide better and faster response to pilot or controller commands and criteria-based operation of the rotorcraft.

The reliability of EMAs has been demonstrated in other fields. For example, modern industrial robots are driven almost entirely by EMAs. Such robots operate under complex duty cycles (at about 1 cycle per second), are in a force fight with other actuators during each cycle, are required to maintain a repeatability for the robot actuator of a few thousandths of an inch, and do so with a 100,000-hour lifetime rating. EMAs have been developed which actually exceed this performance by 3 to 4 orders of magnitude through their emphasis on efficiency, low weight, stiffness, low lost motion, and responsiveness. Such actuators are described, for example, in U.S. Pat. No. 7,081,062 (Tesar), U.S. Pat. No. 7,122,926 (Tesar), U.S. Pat. No. 7,431,676 (Tesar), U.S. Pat. No. 7,722,494 (Tesar), U.S. Pat. No. 8,033,942 (Tesar), U.S. Ser. No. 14/195,603 (Tesar), published as 2014/0224064, and U.S. Ser. No. 14/090,997 (Tesar), published as U.S. 2014/0228162, all of which are incorporated herein by reference in their entirety.

It is an objective of the present disclosure to produce the most useful technology insertion which would disturb the rotor the least while providing programmable blade rotation. In accordance with one aspect of the teachings herein, this is preferably accomplished with a pair of star compound velocity summing actuators (no single point failures) at the base of the blade anchored to the rotor hub, for each of the (typically 2, 3, or 4) blades. The resulting programmable blade rotation may provide response times on the order of milliseconds to air stream conditions, thus helping to maximize efficiency, maneuverability, and safety. Such programmable blade rotation may still permit lead/lag and may greatly simplify the rotor subsystem by, for example, eliminating the need for the rotating swash plate and the connecting linkages.

In accordance with another aspect of the teachings herein, a set of servo drives (preferably four) is utilized to rotate a universal joint to tilt the rotor hub of a rotorcraft. Each axis of the universal (non-rotating) plate is preferably driven by two Compact Parallel Eccentrics (CPE), which may be of unusual torque density. Each CPE may utilize a release clutch to put the CPE into service or, in case of failure, to take the CPE out of service. This universal plate may tolerate one failure per axis and still function satisfactorily, thus addressing the single point of failure issue present in conventional rotorcraft.

In some embodiments, the rotor hub is driven by the transmission and is preferably designed to have a ball socket or universal joint permitting tilting about two axes at 90°. Each axis may be driven by two CPE actuators using connecting rods to a collar with a bearing to the rotor hub. Each axis will preferably have a maximum tilt angle of ±5°. A crank (which preferably rotates ±50°) may be utilized at the CPE to reduce the torque demand on the CPE by as much as 10× or more, while also reducing the weight of the CPE by 10×. This reduction yields a total weight which is far less than an equivalent linear hydraulic actuator, which may translate into significant fuel savings on an annual basis. A release mechanism is preferably provided on each CPE coupler to ensure that both hub axes are fault tolerant. Since the CPE is an intelligent EMA which is preferably capable of providing exceptional torque density and responsiveness, the rotor tilt may be managed in real time (on the order of milliseconds) to provide more optimal control of the aircraft and to respond to pilot commands in a pre-structured decision process.

In other embodiments, a wobble plate may be utilized to adjust blade pitch. In such embodiments, the wobble plate preferably rides on a tilted plate whose tilt is changed to change blade pitch. The wobble plate is preferably equipped with pins for each plate, and each pin is preferably equipped with a connecting rod to a lever on each blade to provide a twist for each hub rotation. It will be appreciated that this approach may be implemented as an entirely mechanical solution.

However, some embodiments of this type which feature a wobble plate may further include a suitable actuator (preferably, a linear actuator) in the connecting rod, which may allow a superposition of a refined, additional control parameter on command. Such an additional control may provide a system which is very responsive on each rotation, perhaps significantly more so than a purely mechanical solution. Implementations of this embodiment may be configured to revert back to the purely mechanical system in the event of actuator failure. Notably, in such embodiments, such a failure would typically not be catastrophic, but would merely result in loss of the refined motion.

In accordance with another aspect of the teachings herein, the longitudinal axis of the turbine drive shaft is preferably oriented so that it is perpendicular (or essentially perpendicular) to the longitudinal axis of the cabin and/or is perpendicular (or essentially perpendicular) to the plane in which the rotor blades rotate. Here, "essentially perpendicular" means perpendicular within a degree of variance that corresponds to the maximum tilt angle of the rotor.

At present, it is conventional to keep the turbine drive shaft parallel to the length of the cabin structure (or, alternatively expressed, to keep the turbine drive shaft essentially parallel to the plane of rotor blade rotation). This convention apparently results in a known and demanding gearing/bearing right turn in the flow of power. Notably, transmission failures in current rotorcraft are primarily due to the aforementioned conventional orientation of the power turbine. Utilizing a vertical orientation of the power turbine may also enhance the effectiveness of the star compound gear transmission (described below), and may achieve the elimination of some or all single point failures in the drive systems of the rotorcraft.

In accordance with a further aspect of the teachings herein, and in order to replace the conventional rotor transmission for rotorcraft, the rotor hub drive may be implemented with a series of star compound gear trains having the basic layout of the low complexity system described in some of the references cited above. These gear trains preferably use the shortest force path, cross roller bearings, and a gear train structure of exceptional ruggedness. It may be necessary or desirable for the power turbine to operate at a nominal speed of 25,000 RPM. The hub drives are preferably connected to the turbine with a slip clutch and a 2-to-1 inverted star compound reducer.

The star compound gear trains of the two switchable Hub Drives (HDs) are preferably attached sequentially (output plate to HD frame). The drive shaft (now at 12,500 RPM) preferably goes through each switchable HD reducer and is preferably connected with an internal servo driven face gear synchro clutch which switches each HD on/off. These respective clutches will separately drive either HD1 or HD2. When HD1 is operational, the splined clutch collar in HD2 preferably locks the star gears to stationary face gears, rigidizing HD2 to act simply as a rigid torque transfer device. Preferably, the reverse is true when HD2 is active and HD1 is rigid. The reduction of HD1 may be, for example, 18-to-1, while that of HD2 may be, for example, 24-to-1. Either may be used to drive the rotor with preferred nominal output speeds of 691 RPM for HD1 and 521 RPM for HD2. The star compound gear drives of HD1 and HD2 further comprise first and second splined clutch collars, respectively. It will thus be appreciated that each of the first and second clutch collars includes star gears and stationary face gears wherein, when the first star compound gear drive is operational, the star gears of the second clutch collar are locked to the stationary face gears of the second clutch collar, and wherein, when the second star compound gear drive is operational, the star gears of the first clutch collar are locked to the stationary face gears of the first clutch collar.

Of course, other nearby reduction ratios can be used. This means that two meaningful speeds of the rotor are provided at, for example, 521 RPM and 691 RPM. In such a case, should HD1 fail, then HD2 may then carry the load at 521 RPM, and vice versa. Note that the HD gear train preferably utilizes standard helical gear teeth, small diameter lightly-loaded bearings in rugged strong back walls, an unloaded shell casing, and cross roller bearings at its backend module which resist forces in all directions. All gear tooth meshes are preferably protected from torques and moments which may otherwise cause misalignment in the tooth mesh. Given the unique nature of the slip clutch, 2-to-1 reducer and power turbine, this HD transmission may provide a means for achieving a transmission system for a rotorcraft that has no single point failures. Such a system would be expected to be superior to the conventional, failure-prone transmissions commonly utilized in rotorcraft.

One benefit of some embodiments of the systems, methodologies and devices disclosed herein is their ability to achieve a significant reduction in weight and volume in rotorcraft. For example, these systems, methodologies and devices may be utilized to achieve a rotorcraft in which the transmission has been simplified, and the swash plates and subsystem linkages to rotate the blades have been discarded. This, in turn, may allow the rotorcraft to carry a larger payload, even in difficult flying conditions.

Moreover, the systems, methodologies and devices disclosed herein may be utilized to achieve a rotorcraft with a high level of functional density (choices) with the exceptional result of no single point failures. Each blade may be rotated individually to best reduce drag, increase lift, and react to unusual (unexpected) conditions which otherwise would only be handled with (limited) oversight guidance from the pilot. This hub/blade rotation cycle may occur in about 170 milliseconds or less. Consequently, programming of the blade twist preferably occurs every 20 milliseconds, or about 8 times per cycle, in order to be effective. Today's modern controllers and embedded electronics, pre-programmed with nominal instantaneous changes each hub cycle, make this 20 millisecond active control entirely feasible. This may substantially improve efficiency, payload, and response to quickly changing ambient (e.g., wind) conditions, while reducing drag and the threat of stall.

The addition of active hub tilt adds another layer of functional control to the rotorcraft. Usually, tilt is a passive, indirect result of the pilot's collective and cyclic control inputs. While this may continue to be the case in the rotorcraft described herein, the tilt angle may now respond to a whole series of operational criteria (ranked and set by the pilot) to substantially (and automatically) improve the overall operation and safety of the aircraft. In other words, this approach allows the rotorcraft to become intelligent. Of course, military rotorcraft face the greatest need for this level of intelligence in order to provide a pathway to meet future unknown threats, since military mission requirements are ever changing.

Figure 1:
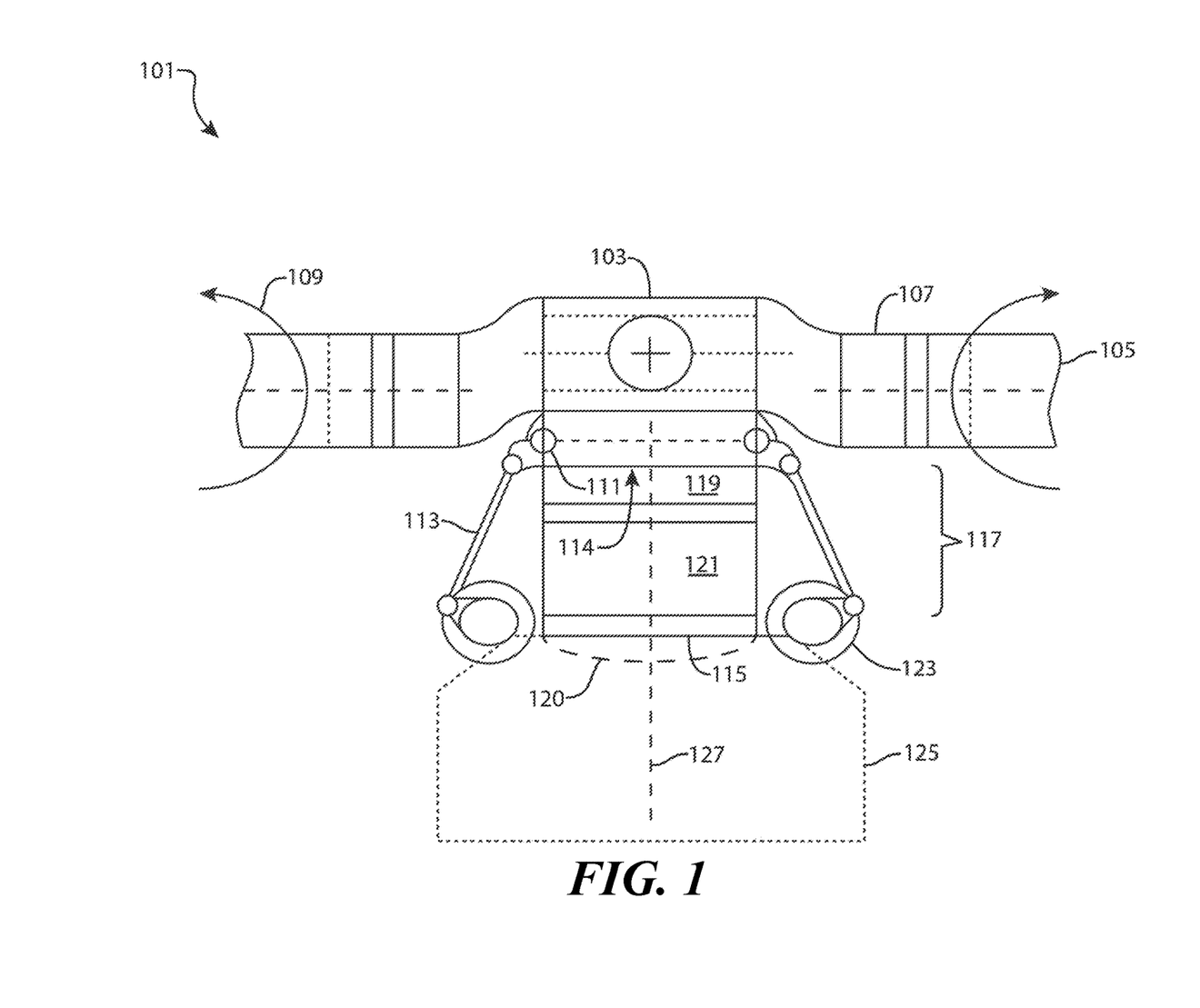
FIG. 1 is a schematic illustration of an active control architecture for a rotorcraft.
Figure 2:
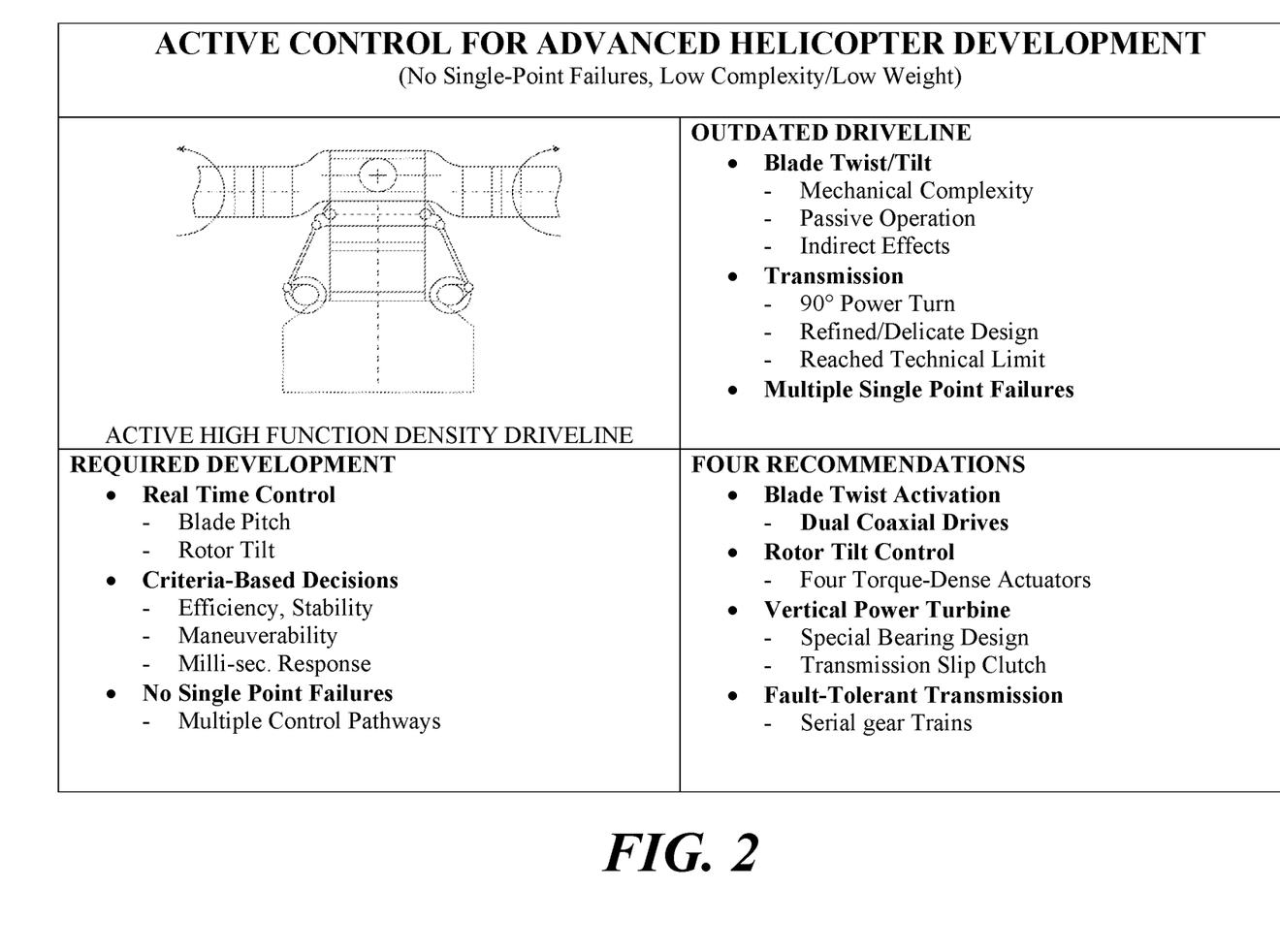
FIG. 2 is a summary of some of the shortcomings of prior art rotorcraft drivelines, some developments required to address these infirmities, and some recommendations for achieving these developments.

The systems, methodologies and devices disclosed herein may be further appreciated with respect to the particular, non-limiting embodiment of an active control for advanced helicopter development which is depicted in FIG. 1. Some of the issues with conventional rotorcraft drivelines which may be addressed with the active control of FIG. 1 are noted in the summary provided in FIG. 2. The required developments which may be implemented in the active control of FIG. 1, and some recommendations for such a system, are also noted in FIG. 2.

As seen in FIG. 1, an active, high function density driveline 101 is provided which is equipped with a power turbine 103 that terminates on a first end in a base 105, and that terminates on a second, opposing end in a rotor hub 107. One or more rotor blades 109 are rotatably attached to the rotor hub 107 by way of one or more (at least one) velocity adding EMA drives 111. The driveline 101 is vertically oriented (that is, the longitudinal axis of the power turbine 103 is oriented so that it is perpendicular to, or essentially perpendicular to, the plane in which the rotor blades 109 rotate). The power turbine 103 includes a first star compound hub drive 115 and a second star compound hub drive 117 which are arranged in series with their output plates/frames attached sequentially.

A slip clutch 119 and a 2-to-1 inverted star compound reducer 121 are disposed between the base 105 of the power turbine 103 and the second star compound hub drive 117, and a cylindrical bearing 123 is disposed between the first star compound hub drive 115 and the rotor hub 107. The driveline 101 is further equipped with a set of hub tilt servos 125. A first end of each hub tilt servo 125 is attached to the cylindrical bearing 123, and a second end of each hub tilt servo 125 is attached to a release mechanism 127. Each of the plurality of servos 125 is attached on a first end thereof to the cylindrical bearing 123, and each of the plurality of servos 125 is attached on a second end thereof to the power turbine 103 by way of the release mechanism 127.

In the case of larger rotorcraft, it is possible to eliminate all remaining single point failures by using two turbines in parallel. Each turbine may use a slip clutch to drive a 2-to-1 reduction gear to drive the principle driveline shaft as it enters two HD switchable star compound gear trains. The resulting system thus comprises a complete duality, thus avoiding all single point pathways and, hence, all single point failures.

It is another object of the present disclosure to provide a simplified, multi-speed transmission for a propeller turbine, especially for vertical take-off and landing (VTOL) aircraft. Presently, VTOL aircraft operate at only one propeller speed, which compromises efficiency during cruise operation. Moreover, most current propeller turbines are required to operate at a nearly constant speed which is near the speed that provides optimum efficiency. This reality creates a conflict between full power (and speed) for VTOL aircraft and half power at cruise. Typically, half power in such aircraft can only be achieved by reducing the propeller speed by 50% and retaining full speed in the power turbine. NASA and others have studied the gear transmission to determine if a two-speed transmission is feasible. See, e.g., Stevens, M. S., Handschuh, R. F., Lewicki, D. G., Variable/Multi-speed Robocraft Drive System Concepts, NASA/TM—2009-215456 (March 2009). However, the limited reviews resulting from this work do not adequately define a useful multi-speed (e.g., two-speed) transmission.

It is thus an object of the present disclosure to dramatically simplify the transmission of power from a turbine (such as, for example, a 6000 H.P. turbine at 15000 RPM) to a multi-speed propeller (such as, for example, a 333/167 RPM two-speed propeller). It is also an object to accomplish the foregoing objective while enhancing cruise efficiency and reducing transmission weight.

Figure 3:
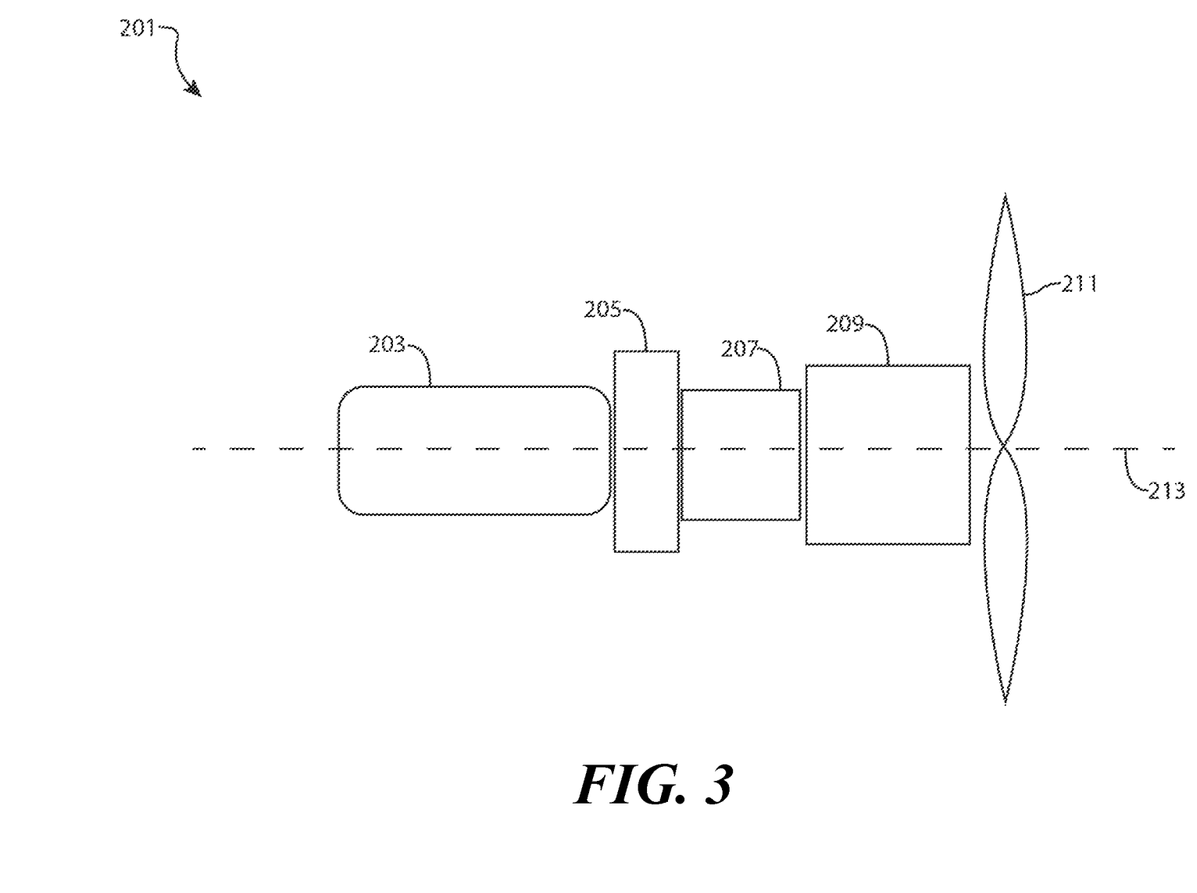
FIG. 3 is an illustration of a particular, non-limiting embodiment of a 2-speed star compound gear train in accordance with the teachings herein.

FIG. 3 depicts a particular, non-limiting embodiment of a layout for a two-speed transmission for a VTOL aircraft. The development requirements for this embodiment as implemented in the V-22 Osprey aircraft (to which this particular embodiment is specifically directed) are summarized in FIG. 4. However, while this embodiment may be described at times with respect to its particular implementation in the V-22 Osprey aircraft, one skilled in the art will appreciate that the devices, systems and methodologies disclosed herein, including the two-speed transmission described in FIG. 3, is readily applicable (with suitable modifications) to, and may be implemented in, a wide variety of VTOL aircraft.

As seen in FIG. 3, the drive train 201 disclosed therein includes a power turbine 203 which drives a sophisticated power clutch 205, which in turn drives a front end inverted star compound gear train 207 (preferably with a 9 to 1 reduction). The inverted star compound gear train 207 drives a Multi-speed Drive Propeller (MDP) 209, preferably with two ratios (5 to 1 and 10 to 1). The MDP 209 then drives the propeller 211. The drive train 201 preferably includes a cross power coupling with a drive circuit attached directly to the two propellers 211, which are disposed about centerline 213.

The power turbine 203 in the embodiment of FIG. 3 preferably operates at 15,000 RPM and 1080 ft.-lb. torque, although one skilled in the art will appreciate that power turbines of this type can be configured or designed to achieve other operating parameters as well. After the front end inverted star compound gear train 207, these values are preferably 1667 RPM and 9700 ft.-lb., respectively. With the two-speed MDP 209, these values may become either 167 RPM and 97,050 ft.-lb., or 333 RPM and 48,525 ft.-lb., with a total reduction of either 90 to 1 or 45 to 1. The last gear mesh in the drive train 201 preferably uses a 3 to 1 star/internal gear. This mesh allows the use of circular arc gear teeth which, in a helical form, may carry up to 4× more load than straight spur teeth.

The final bearing in the driveline 201 (in the MDP 209) is a cross roller bearing which is extremely rugged (resisting forces in all directions), light weight, stiff, and takes up little volume. Its use results in a very short force path between the transmission frame and the propeller attachment (minimum deformation, minimum effects of tolerance and temperature; and maximum compactness). Design experience suggests that the overall length of the transmission will be reduced by 2.5× and its weight reduced by 2.0×, while also permitting the use of a synchro mesh clutch in the MDP for a shift ratio of 2×.

One issue that may need to be addressed in implementations of this embodiment is the use of a high slip power clutch to speed up the propeller. For example, a high slip power clutch may be required to speed up the propeller from 167 RPM (during cruise) to 333 RPM (during VTOL). This clutch may be required to transmit torque from 3000 H.P. to 6000 H.P. in a relatively short time. Such a powered slip will create considerable heat, and hence may require on-demand cooling from a unique cold reservoir. On the other hand, it may be possible to transition from cruise to vertical lift by distributing 100% of the power from one pod to the other (both at 50% power) while one pod is shifting to high speed, and to reverse this process to shift the second pod to high speed. Doing so may have the advantage of dramatically reducing the size and critical nature of the power slip clutch.

Figure 5:
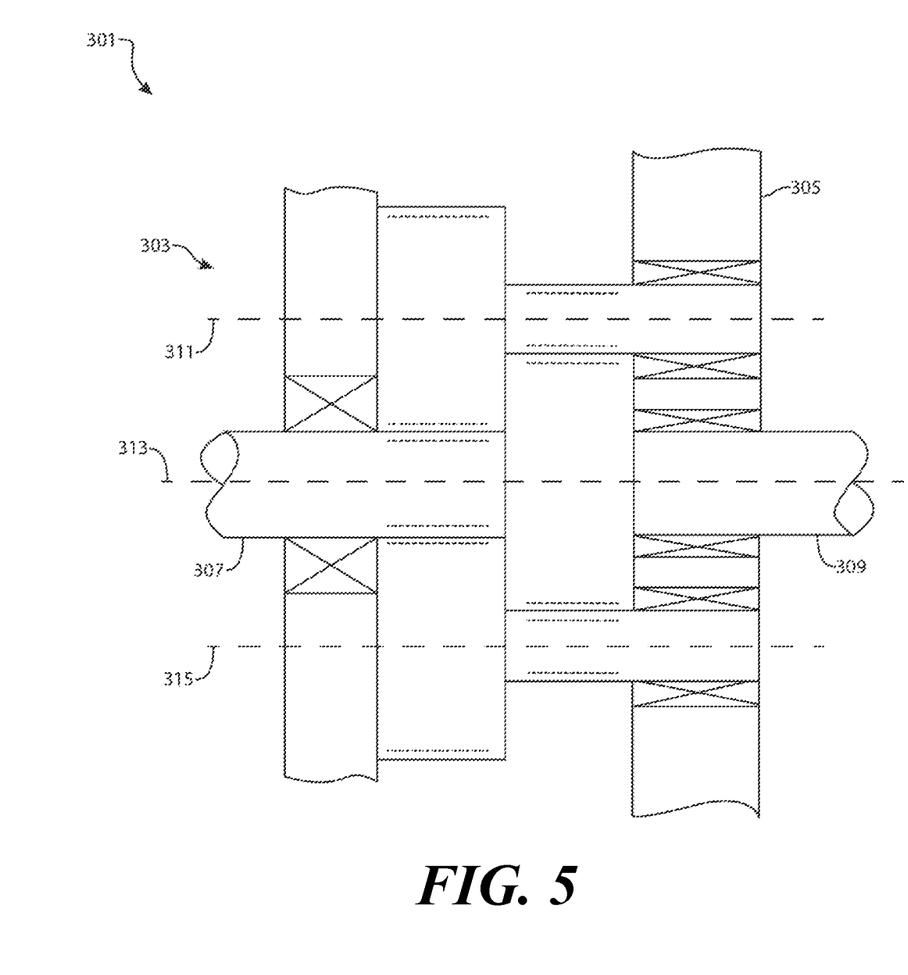
FIG. 5 is a particular, non-limiting embodiment of a simplified front end for a 2-speed Osprey class rotorcraft. This particular front end is equipped with an extremely rugged/compact star compound reducer.

After the powered slip clutch, the transmission uses the simplified inverted star compound gear train reducer 301 depicted in FIG. 5 as the front end. This gear reducer 301, which may be made extremely rugged and compact, includes a clutch turbine 303 with centerlines 313, 315, a shell structure 305, an input 307 (with centerline 311) and an output 309 (to the MDP 209; see FIG. 3). The gear reducer 301 has the ratio $g=r_1 r_3/r_2 r_4$. Using the values for the gears as $r_1=1$, $r_2=3$, $r_3=1$, $r_4=3$ results in a reduction of 9× or $g=1/9$. This reduces the propeller speed from 15,000 to 1666.7 RPM.

Figure 6:
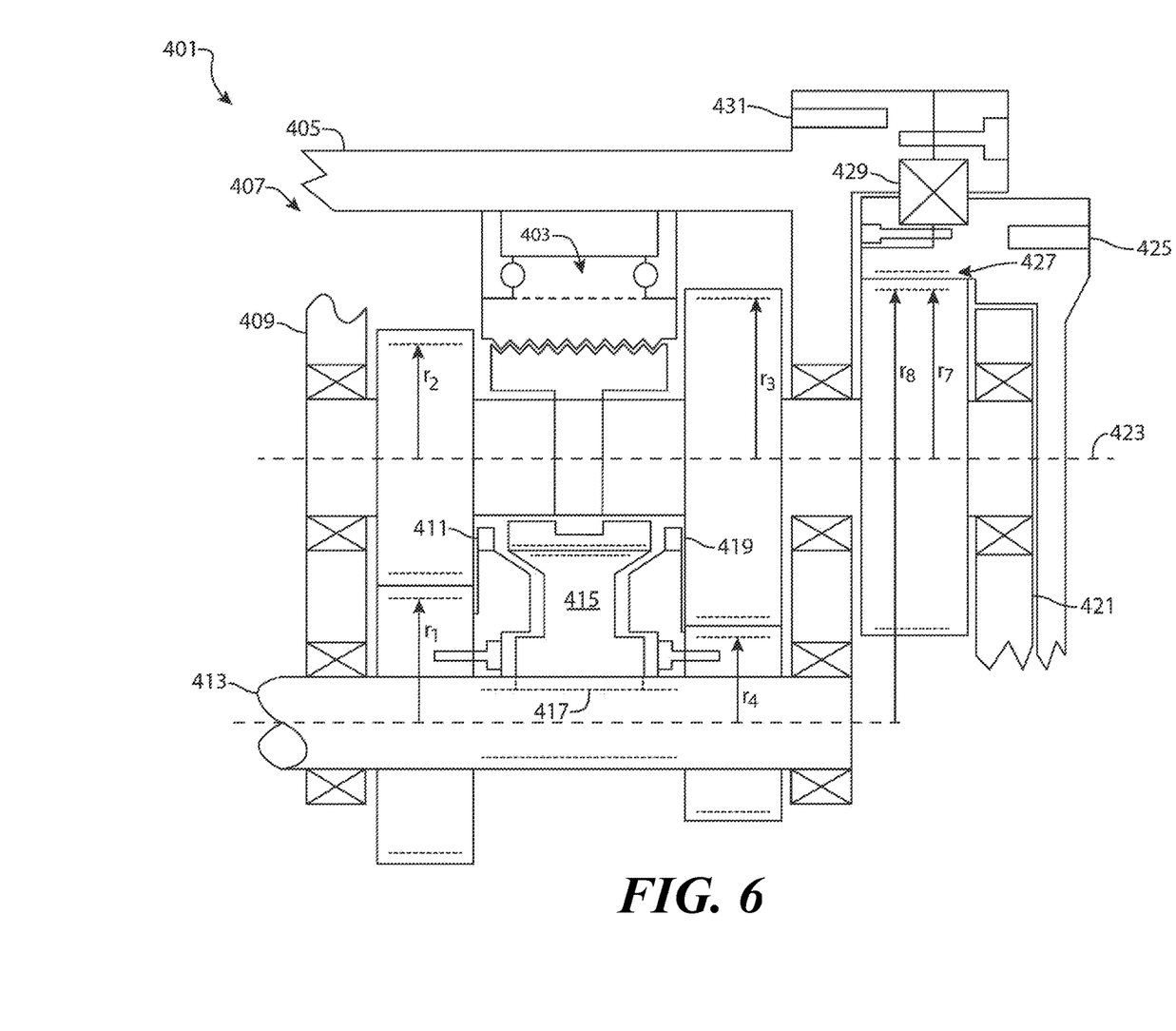
FIG. 6 is a particular, non-limiting embodiment of a simplified 2-speed back end of a gear train for an Osprey class rotorcraft. This particular back end is based on modest gear mesh ratios of less than 3 to 1.

The back end of the gear train, and next in the transmission, is a simplified 2-speed star compound gear train 401 depicted in FIG. 6. This gear train 401 includes a clutch drive 403, an actuator shell 405 which encloses an interior space 407, a shell frame 409, a left face gear 411, a front end input 413, a dual function cone cylinder 415, a drive spline 417, a right gear 419, a cage 421, a gear shaft 423, a wheel attachment 425, an internal gear 427, a principal bearing 429, and a frame attachment 431.

Figure 4:
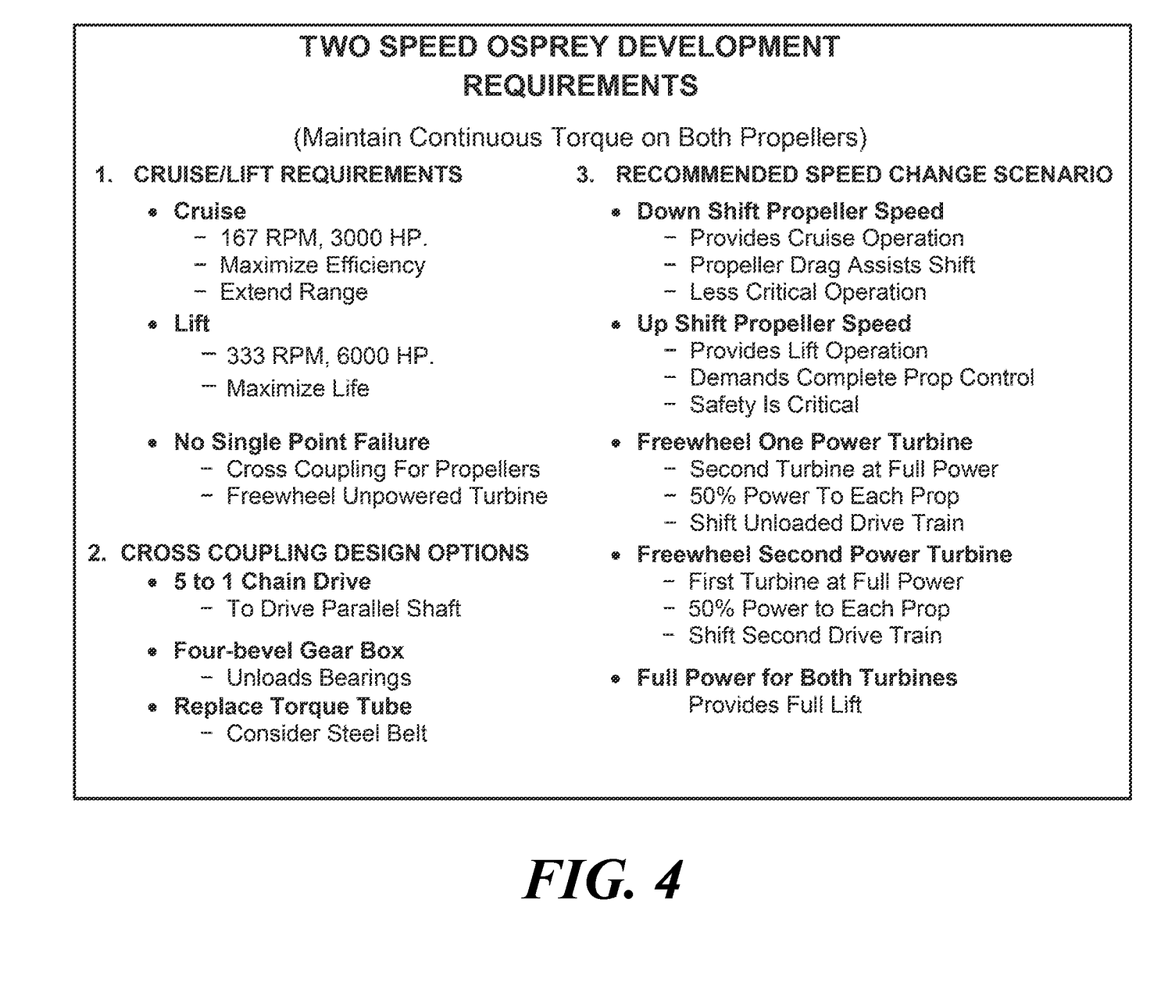
FIG. 4 is a summary of cruise/lift requirements, cross coupling design options and recommended speed change scenarios for development of a particular, non-limiting embodiment of a 2-speed Osprey class rotorcraft.

The simplified 2-speed star compound 401 depicted in FIG. 4 is based on modest gear mesh ratios of less than 3 to 1, and is equipped with an output pair of gears $r_7$ and $r_8$. The two speeds are achieved by using a synchro clutch drive 403 between the left 411 and right 419 two face gears on gear 1 and gear 4 to drive separately either gear 2 or gear 3 on the same star gear shaft, which, then, drives gear 7, which, then, drives internal gear 8. High speed is achieved by engaging gear 1 and low speed is obtained by driving gear 4. In this arrangement, the low speed gear ratio is given by EQUA- TION 1 below, the high speed gear ratio is given by EQUATION 2 below, and the shift ratio is given by EQUATION 3 below:

$$\text{Low Speed} \quad g_\ell = r_1 r_7 / r_2 r_8 \quad \text{(Equation 1)}$$

$$\text{High Speed} \quad g_h = r_4 r_7 / r_3 r_8 \quad \text{(Equation 2)}$$

$$\text{Shift Ratio} \quad \tilde{g} = g_h / g_\ell = r_1 r_3 / r_2 r_4 \quad \text{(Equation 3)}$$

If $r_1=1$, then $r_2$ may be obtained from the high speed reduction ratio of 5 to 1 as shown in EQUATION 4:

$$g_h = \frac{1}{r_2}\frac{1}{3} = \frac{1}{5} \Rightarrow r_2 = 1.667 \quad \text{(EQUATION 4)}$$

With the low speed ratio of 10 to 1, then the low speed gear ratio is given by EQUATION 5 below:

$$g_\ell = \frac{r_4}{3 r_3} = \frac{1}{10} \quad \text{(EQUATION 5)}$$

And with $$r_4 = 1 + r_2 - r_3 \quad \text{(EQUATION 6)}$$

then $r_3 = 2.05$ and $r_4 = 0.617$.

Figure 7:
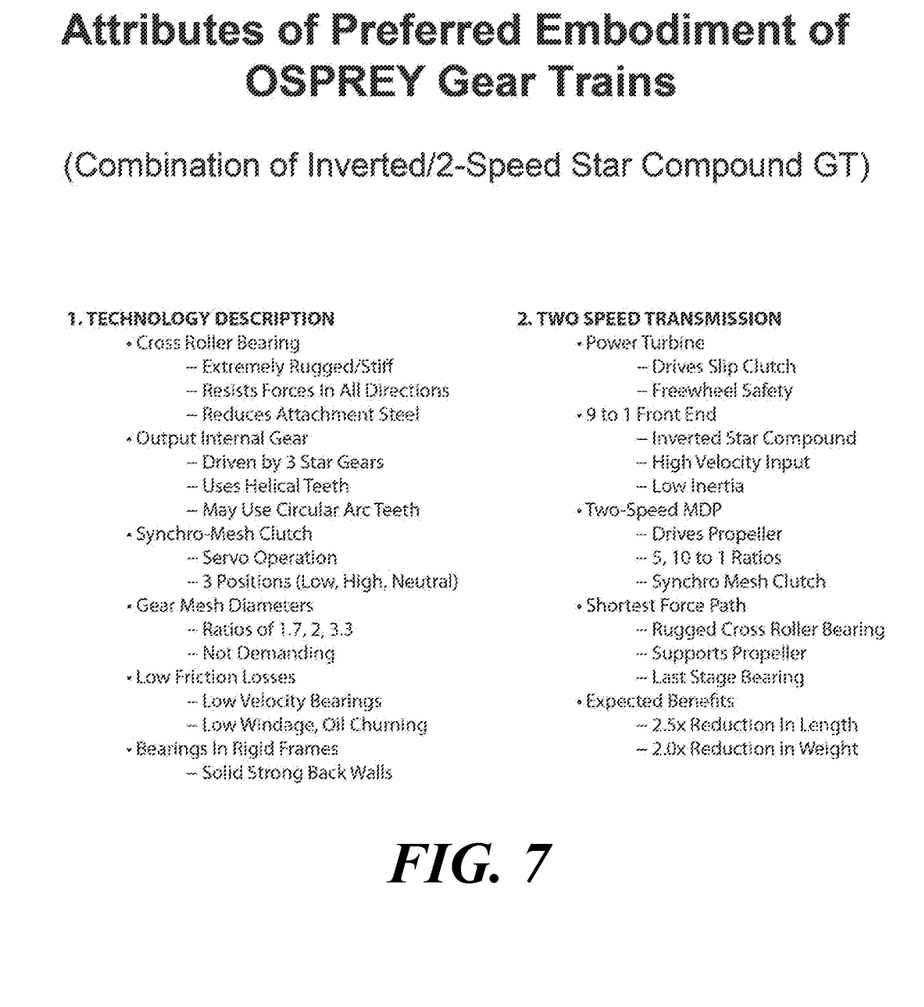
FIG. 7 is a summary of the attributes of a preferred embodiment of a gear train for an Osprey class rotorcraft in accordance with the teachings herein.

The attributes of the front end and back end combined are that they are extremely compact. Some of the attributes of a preferred embodiment of the resulting gear train are summarized in FIG. 7. The front can be quite small with low effective inertia which is of real merit with an input speed of 15,000 RPM. The input torque of the front end is preferably approximately 1080 ft.-lb., with an output torque which is preferably about 9705 ft.lb. Even though these are high values, the symmetric gear arrangement of the three star gears carries this load quite well. The back end has the synchro mesh clutch to deal with two shift speeds. To do so, it is desirable to position a power slip clutch between the front and the gas turbine. This power slip clutch may have to accommodate approximately 1100 ft.lb. at 15,000 RPM, which is quite demanding for a slip clutch (see above).

The MDP internal clutch then separates the low mass front end from the propeller when it is in neutral. The floating mass in the front end (separated from the gas turbine) must be shifted up and down in speed by the synchro cone clutch in the MDP. It is, then, desirable to keep the effective mass in the front end as low as possible. The structural ruggedness of the back end gear train is typically a key consideration in this design suggestion.

A preferred embodiment of the transmission described herein has six principle attributes. First of all, the principal large diameter cross roller bearing preferably operates at either 167 or 333 RPM, which is quite low in speed. The cross roller bearing is preferably the bearing for both the gear train and the propeller, which may dramatically reduce weight and the number of parts, while increasing the system's ability to resist forces and moments in all directions.

Secondly, the internal gear ($r_8$) is most effective in carrying the propeller torque because of its large diameter and helical circular arc gear teeth, and because it is driven by three separate gears ($r_7^1$, $r_7^2$, $r_7^3$) to create an exceptionally rugged (and therefore lightweight) gear reducer.

Thirdly, the clutch in the back end is preferably operated by a separate servo motor to give precise force control of the cone clutches and maintain neutral (no force and no engagement) when required.

Fourthly, all gear meshes in the back end are modest in the relative diameters of the meshing gears, and observe the equality of EQUATION 7:

$$\frac{r_8}{r_7} = 2, \frac{r_2}{r_1} = \frac{r_3}{r_4} = 3.32 \quad \text{(EQUATION 7)}$$

This relationship suggests good design, durability, and ease of production.

Fifthly, the first gears in the front end $r_2$, $r_3$ as star gears preferably rotate at 50% less of the speed of the gas turbine. Consequently, the associated windage and lubricant churning are typically quite low. The bearings that support the star gear shafts are typically rotating at relatively low velocities, which enhances their durability and further reduces friction losses.

Sixthly, with the above noted attributes, the gears in the two-speed MDP may operate at angular velocities below 1000 RPM. This reduces their effective inertia by more than 27 times, improves bearing life, ensures low windage, reduces lubricant churning losses, and imparts other advantages. All bearings are preferably located in rigid transmission cross disks (plates) as rigid parts of the transmission shells. Because of the symmetry of the forces on the star gears, the drive shaft bearings will typically experience no radial loads, thereby ensuring durability and low friction losses. Finally, the cross disks and shells do not experience any twisting or bending moments generated by internal gear forces.

Regarding shift clutch operation, for safety reasons, it is desirable to have both propellers tied together by a power transfer coupling in case one of the power/transmission modules fails during vertical lift maneuvers. This existing coupling may make the power shift with a slip clutch much less demanding. It may be desirable in some implementations that the power supplied by one power unit reduces or eliminates the need for power in the other unit during the upshift operation.

Shifting to lower power and transfer from lift to cruise operation is not a demanding function on the slip clutch because the propeller is forced to reduce speed as a result of its natural drag forces, thus relieving the clutch of much of the inertia energy to be removed by slip friction in the clutch. On the other hand, the move from cruise to lift operation typically requires a huge transfer of energy through the slip clutch to bring the propeller inertia up to speed and to overcome the increasing drag forces on the propeller due to the required increase in speed.

The upshift is clearly the most demanding. Also, it is undesirable to not have power flow in either propeller even for the short period required for shifting of the speed ratio using the synchro mesh clutches. The power coupling ensures that none of the propellers are ever unpowered. While one power unit is being shifted (especially in the upshift) and does not drive its respective propeller for a short time, the other power unit can produce full power for a short period with half of its power transferred through the cross coupling unit to the unpowered propeller. While the unpowered propeller is being shifted, both the power demands on the synchro clutch and the slip clutch are dramatically reduced. This arrangement may not only improve safety, but may also reduce the potential slip clutch weight, mitigate cooling problems and provide other advantages, while increasing durability and reducing cost.

The importance of the design and operation of the cross coupling subsystem may be appreciated from the foregoing. In some embodiments, other coupling component technologies may be utilized as alternatives. For example, a 5 to 1 chain take off from the propeller to the parallel shaft may be utilized for the cross coupling subsystem. Chain drives do very well at high loads and low speeds.

Moreover, each parallel shaft will preferably go through a 90° turn if a torque tube is used as the cross coupling power transfer medium. In embodiments where such a power transfer medium is utilized, a complete four-bevel gear box is preferably used to unload the bearing force levels on the bevel gear shafts, to keep all forces and moments contained in the box, and to unload the contact force on any single pair of teeth in mesh.

A torque tube is perhaps 1000 times less efficient in terms of deformation per unit weight than a steel belt to tie the two parallel shafts together across the aircraft. It is desirable to control flutter in the steel belt with contact dampers. Using the belt may eliminate 90° bevel gear turns, multiple vibration absorbers, several universal joints, and heavy curvic couplers.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. It will also be appreciated that the various features set forth in the claims may be presented in various combinations and sub-combinations in future claims without departing from the scope of the invention. In particular, the present disclosure expressly contemplates any such combination or sub-combination that is not known to the prior art, as if such combinations or sub-combinations were expressly written out.

What is claimed is:

1. A rotorcraft, comprising:
    a rotor hub;
    at least one rotor blade attached to said rotor hub by way of at least one velocity summing electromechanical actuator (EMA) drive; and
    a turbine which rotates said rotor hub by way of an inverted star compound reducer and first and second serial star compound gear drives;
    wherein said first and second star compound gear drives are switchable drives having first and second respective output plates and first and second respective frames, wherein said first output plate is attached to the frame of said second star compound gear drive, and wherein said second output plate is attached to said first output plate in a face-to-face arrangement.

2. The rotorcraft of claim 1, wherein said inverted star compound reducer is a 2-to-1 inverted star compound reducer.

3. The rotorcraft of claim 1, wherein said at least one rotor blade rotates in a first plane.

4. The rotorcraft of claim 3, wherein said turbine has a longitudinal axis, and wherein said longitudinal axis is perpendicular to said first plane.

5. The rotorcraft of claim 3, further comprising a plurality of velocity adding star compound EMA drives disposed between said at least one rotor blade and said rotor hub.

6. The rotorcraft of claim 1, further comprising a plurality of servo drives which tilt said rotor hub.

7. The rotorcraft of claim 6, further comprising a universal joint, wherein said plurality of servo drives tilt said rotor hub by rotating said universal joint.

8. The rotorcraft of claim 6, wherein each of said plurality of servo drives is a compact parallel eccentric (CPE) actuator.

9. The rotorcraft of claim 8, further comprising a cylindrical bearing disposed between said rotor hub and said plurality of servo drives.

10. The rotorcraft of claim 9, wherein each of said plurality of servo drives is attached on a first end thereof to said cylindrical bearing, and wherein each of said plurality of servo drives is attached on a second end thereof to said turbine by way of a release clutch.

11. The rotorcraft of claim 1, wherein said at least one velocity summing EMA drive includes a plurality of velocity summing EMA drives, and wherein each of said plurality of velocity summing EMA drives is a star compound actuator.

12. The rotorcraft of claim 11, wherein said plurality of velocity summing EMA drives are coupled together in a velocity summing arrangement to produce a single motion output.

13. A rotorcraft, comprising:
    a rotor hub;
    at least one rotor blade attached to said rotor hub by way of at least one velocity summing electromechanical actuator (EMA) drive; and
    a turbine which rotates said rotor hub by way of an inverted star compound reducer and first and second serial star compound gear drives, wherein said first serial star compound gear drive is equipped with a first clutch collar, and wherein said second serial star compound gear drive is equipped with a second clutch collar;
    wherein each of said first and second clutch collars includes star gears and stationary face gears, wherein, when said first star compound gear drive is operational, the star gears of the second clutch collar are locked to the stationary face gears of the second clutch collar, and wherein, when said second star compound gear drive is operational, the star gears of the first clutch collar are locked to the stationary face gears of the first clutch collar.

14. The rotorcraft of claim 13, wherein said inverted star compound reducer is a 2-to-1 inverted star compound reducer.

* * * * *